(12) United States Patent
Mair et al.

(10) Patent No.: US 10,518,887 B2
(45) Date of Patent: Dec. 31, 2019

(54) ROTATIONALLY-ENGAGED QUICK INSTALLATION TRACK FITTING

(71) Applicant: The Boeing Comapny, Chicago, IL (US)

(72) Inventors: Roland D. Mair, Chicago, IL (US); Russell W. Keck, Chicago, IL (US)

(73) Assignee: The Boeing Company, Chicago, IL (US)

( * ) Notice: Subject to any disclaimer, the term of this patent is extended or adjusted under 35 U.S.C. 154(b) by 153 days.

(21) Appl. No.: 15/636,698

(22) Filed: Jun. 29, 2017

(65) Prior Publication Data

US 2019/0002107 A1 Jan. 3, 2019

(51) Int. Cl.
  *B64D 11/00* (2006.01)
  *B64D 11/06* (2006.01)
  *B60N 2/015* (2006.01)
  *F16B 21/02* (2006.01)

(52) U.S. Cl.
  CPC ...... *B64D 11/0696* (2013.01); *B60N 2/01583* (2013.01); *F16B 21/02* (2013.01); *B64D 2011/0046* (2013.01)

(58) Field of Classification Search
  CPC ......... B64D 11/0696; B64D 2011/0046; F16B 21/02; B60N 2/01583
  See application file for complete search history.

(56) References Cited

U.S. PATENT DOCUMENTS

| | | | | |
|---|---|---|---|---|
| 4,109,891 A | * | 8/1978 | Grendahl | B60P 7/0815 248/503.1 |
| 4,770,459 A | * | 9/1988 | Nakaiwa | B60N 2/366 248/503.1 |
| 4,776,533 A | * | 10/1988 | Sheek | B64D 11/0696 244/118.6 |
| 4,796,837 A | * | 1/1989 | Dowd | B64D 11/0696 244/122 R |
| 4,911,381 A | * | 3/1990 | Cannon | B64D 11/0696 244/122 R |
| 4,936,527 A | | 6/1990 | Gorges | |

(Continued)

FOREIGN PATENT DOCUMENTS

| | | | | |
|---|---|---|---|---|
| DE | 202011108804 U1 | * | 1/2012 | ......... B60N 2/01575 |
| DE | 102017104601 A1 | * | 9/2018 | ............... B64C 1/20 |

(Continued)

OTHER PUBLICATIONS

European Search Report prepared by the European Patent Office in application No. EP 18 17 1698.6 dated Nov. 28, 2018.

*Primary Examiner* — Eret C McNichols
(74) *Attorney, Agent, or Firm* — McDonnell Boehnen Hulbert & Berghoff LLP

(57) ABSTRACT

Example devices for the rapid attachment of a track mounted product to a track and methods of use are described herein. An example device includes an elongated member having a flange and a body. A first side of the body includes a protruding lip extending from at least a portion of the body between the first end and the second end of the elongated member. The device also includes a first alignment bore coupled to the first side of the flange between the first end and the second end of the elongated member. The device also includes a first boss extending from a second side of the body between the first end and the second end of the elongated member.

27 Claims, 9 Drawing Sheets

(56) References Cited

U.S. PATENT DOCUMENTS

| | | | |
|---|---|---|---|
| 5,083,726 A | 1/1992 | Schurr | |
| 5,169,091 A * | 12/1992 | Beroth | B64D 9/003 244/118.1 |
| 5,178,346 A * | 1/1993 | Beroth | B64D 9/003 244/118.1 |
| 5,337,979 A * | 8/1994 | Bales | B64D 11/0696 244/118.1 |
| 5,449,132 A * | 9/1995 | Gilbert | B64D 11/0696 244/122 R |
| 6,902,365 B1 * | 6/2005 | Dowty | B64D 11/0696 244/118.6 |
| 7,438,511 B2 * | 10/2008 | Legeay | B64D 11/0696 410/104 |
| 8,066,248 B2 * | 11/2011 | Christensen | B64D 11/0696 248/429 |
| 8,517,310 B2 * | 8/2013 | Marechal | B60N 2/01516 244/118.6 |
| 8,602,702 B2 * | 12/2013 | Roy | B64D 11/0696 244/118.6 |
| 8,628,053 B2 * | 1/2014 | Marechal | B64D 11/0696 244/118.5 |
| 8,998,323 B2 * | 4/2015 | Day | B60N 2/42736 297/216.18 |
| 9,522,736 B2 * | 12/2016 | Danet | F16B 2/185 |
| 9,663,232 B1 * | 5/2017 | Porter | B64D 11/0696 |
| 9,878,639 B2 * | 1/2018 | Sawdy | B60N 2/01525 |
| 9,896,001 B1 * | 2/2018 | Brodish | B64D 11/0648 |
| 10,059,230 B2 * | 8/2018 | Kume | A47C 1/12 |
| 2005/0109877 A1 * | 5/2005 | Williamson | B64D 11/0696 244/118.1 |
| 2005/0180836 A1 * | 8/2005 | Dowty | B64D 11/0696 410/105 |
| 2008/0191115 A1 * | 8/2008 | Stubbe | B64D 11/0696 248/503.1 |
| 2011/0013972 A1 | 1/2011 | Roy et al. | |
| 2013/0259562 A1 * | 10/2013 | Burd | B64D 11/04 403/187 |
| 2016/0107542 A1 * | 4/2016 | Trimble | B60N 2/01575 296/65.03 |
| 2016/0194085 A1 * | 7/2016 | Stubbe | B64D 11/0696 248/503.1 |
| 2016/0251082 A1 | 9/2016 | Shih et al. | |
| 2016/0304183 A1 * | 10/2016 | Ahlen | B64C 1/00 |
| 2017/0259924 A1 * | 9/2017 | Olulana | B64D 11/064 |
| 2017/0275003 A1 * | 9/2017 | Erhel | B60N 2/06 |
| 2018/0134182 A1 * | 5/2018 | Hoshide | B60N 2/0727 |
| 2018/0222591 A1 * | 8/2018 | Pacheco | B64D 11/0619 |
| 2019/0092478 A1 * | 3/2019 | Gilbert | B64C 1/20 |

FOREIGN PATENT DOCUMENTS

| | | | | |
|---|---|---|---|---|
| FR | 1326558 A * | 5/1963 | | B64D 11/0696 |
| WO | WO-2008113610 A2 * | 9/2008 | | B60N 2/01575 |

* cited by examiner

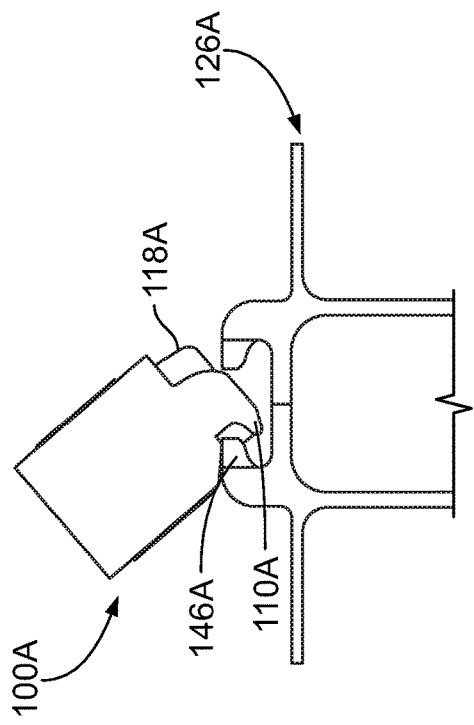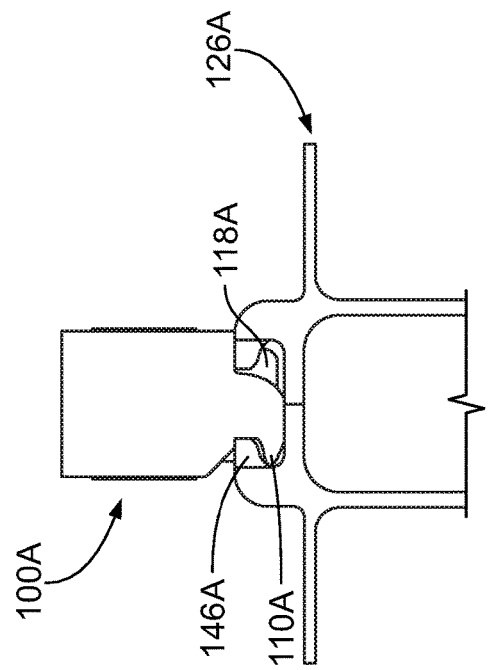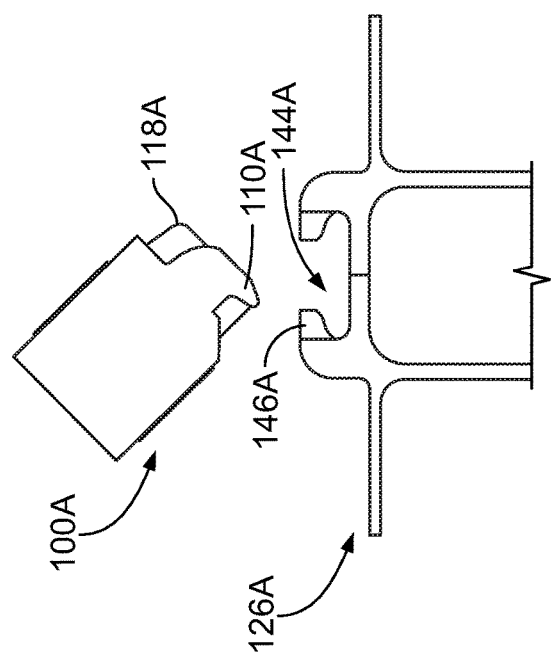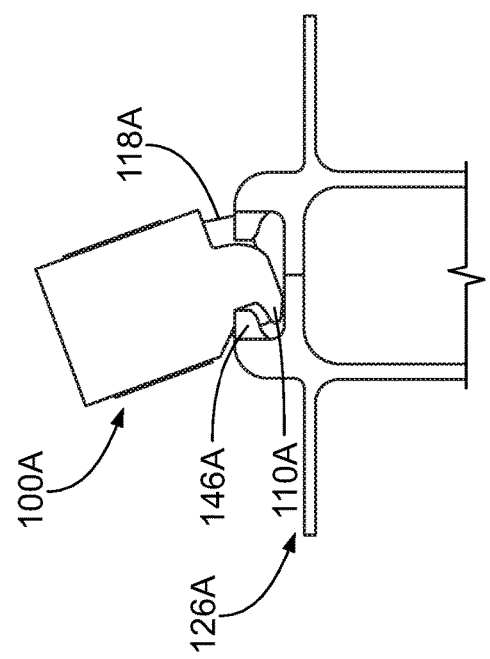

ROTATIONALLY-ENGAGED QUICK INSTALLATION TRACK FITTING

FIELD

The present disclosure relates generally to a quick engagement seat track fitting device, and method for the rapid attachment of a track mounted product of an aircraft or other vehicle.

BACKGROUND

Many track mounted products in aircrafts are mounted to seat tracks, which, in most cases, are universal and standard in the industry. Structural seat track fittings are required to mount and retain track mounted products to the airplane structure. Several types of seat track fittings are available and utilized today. These existing seat track fittings can be broken out into two main categories. The first category includes low cost systems that use multiple parts that are removably connected to one another. However, these seat track fittings are not installation friendly, requiring direct access to the seat track. Further, these components require hardware to assemble the multiple parts, resulting in increased installation and removal time as well as introducing ergonomic concerns due to the difficult installation. The second category of existing seat track fittings includes quick installation seat track fittings that are mostly utilized on high quantity items, such as seats themselves. Unfortunately, these quick installation features are accomplished through the utilization of relatively complex mechanisms, resulting in increased cost and certification effort.

As production rates and affordability of assembly become increasingly critical, the airline industry is in need of quick installation fittings that do not result in increased cost or compromise safety and ergonomics. Furthermore, airlines regularly re-configure interiors during an aircraft's lifecycle or have a need to remove track mounted products for other reasons, such as regular maintenance. Reduced track mounted product installation and removal time results in efficiencies for aircraft original equipment manufacturers (OEMs) as well as operators.

SUMMARY

The present disclosure describes a seat track fitting design that simplifies the installation of seat track mounted track mounted products, without the utilization of complex mechanisms. The device described herein reduces the number of fasteners required for installation and enables placement of fastening hardware in convenient to access locations. The device utilizes simple machined parts without the need for moving components or internal mechanisms that drive complexity and cost. The seat track fitting design described herein employs a novel attachment method via a rotational motion (e.g., rotation along a longitudinal axis) about one row of an overhang portion of the seat track. This motion moves a flange of the device underneath the overhang portion of the seat track (capturing the overhang portion and locking the device to the track vertically in a Z-direction) and also drops shear bosses of the device into corresponding holes in the track (locking the device to the track horizontally in an X-Y direction). Then the track mounted product is installed via bayonet brackets that prevent the device from rotating out, while simultaneously fixing the track mounted product to the seat tracks.

In particular, in a first aspect, a device is described. The device includes an elongated member having a flange and a body. The elongated member includes a first end and a second end extending along a longitudinal axis of the elongated member. The flange includes a first side and a second side, the second side opposite the first side. The body is connected to and extends away from the second side of the flange. The body includes a first side, a second side, and a third side, wherein the first side of the body is opposite the second side of the body, and the third side of the body is opposite the first side of the flange. The first side of the body includes a protruding lip extending from at least a portion of the body between the first end and the second end of the elongated member. The device also includes a first alignment bore coupled to the first side of the flange between the first end and the second end of the elongated member. The device also includes a first boss extending from the second side of the body between the first end and the second end of the elongated member.

In a second aspect, a system is described. The system includes a first device comprising (i) a first elongated member having a first flange and a first body, wherein the first elongated member includes a first end and a second end extending along a longitudinal axis of the first elongated member, wherein the first flange includes a first side and a second side, the second side opposite the first side, wherein the first body is connected to and extends away from the second side of the first flange, wherein the first body includes a first side, a second side, and a third side, wherein the first side of the first body is opposite the second side of the first body, and the third side of the first body is opposite the first side of the first flange, and wherein the first side of the first body includes a first protruding lip extending from at least a portion of the first body between the first end and the second end of the first elongated member, (ii) a first alignment bore coupled to the first side of the first flange between the first end and the second end of the first elongated member, (iii) a second alignment bore coupled to the first side of the first flange between the first end and the second end of the first elongated member, (iv) a first boss extending from the second side of the first body between the first end and the second end of the first elongated member, and (v) a second boss extending from the second side of the first body between the first end and the second end of the first elongated member. The system also includes a second device comprising (i) a second elongated member having a second flange and a second body, wherein the second elongated member includes a first end and a second end extending along a longitudinal axis of the second elongated member, wherein the second flange includes a first side and a second side, the second side opposite the first side, wherein the second body is connected to and extends away from the second side of the second flange, wherein the second body includes a first side, a second side, and a third side, wherein the first side of the second body is opposite the second side of the second body, and the third side of the second body is opposite the first side of the second flange, and wherein the first side of the second body includes a second protruding lip extending from at least a portion of the second body between the first end and the second end of the second elongated member, (ii) a third alignment bore coupled to the first side of the second flange between the first end and the second end of the second elongated member, (iii) a fourth alignment bore coupled to the first side of the second flange between the first end and the second end of the second elongated member, (iv) a third boss extending from the second side of the second body between the first end and the second end of the second elongated member, and (v) a fourth boss extending from the second side of the second body between the first end and the second end of the second elongated member.

In a third aspect, a method is described. The method includes positioning a first device into an opening in a first track, wherein the first track includes an overhang portion to receive a protruding lip of a body of an elongated member of the first device to thereby prevent vertical movement of the first device with respect to the first track. The method also includes rotating the first device with respect to the first track until a first boss and a second boss of the first device are positioned in corresponding cutouts in the first track to thereby prevent horizontal movement of the first device with respect to the first track. The method also includes positioning a second device into an opening in a second track, wherein the second track includes an overhang portion to receive a protruding lip of a body of an elongated member of the second device to thereby prevent vertical movement of the second device with respect to the second track. The method also includes rotating the second device with respect to the second track until a first boss and a second boss of the second device are positioned in corresponding cutouts in the second track to thereby prevent horizontal movement of the second device with respect to the second track. The method also includes positioning a first pin of a track mounted product through a first alignment bore of the first device. The method also includes positioning a second pin of the track mounted product through a second alignment bore of the first device. The method also includes positioning a third pin of the track mounted product through a first alignment bore of the second device. The method also includes positioning a fourth pin of the track mounted product through a second alignment bore of the second device.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

FIGS. 5A-5D illustrate a side view of the device of FIG. 2 rotationally engaging a track, according to an example embodiment.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

As used herein, "coupled" means associated directly as well as indirectly. For example, a member A may be directly associated with a member B, or may be indirectly associated therewith, e.g., via another member C. It will be understood that not all relationships among the various disclosed elements are necessarily represented.

Figure 9:
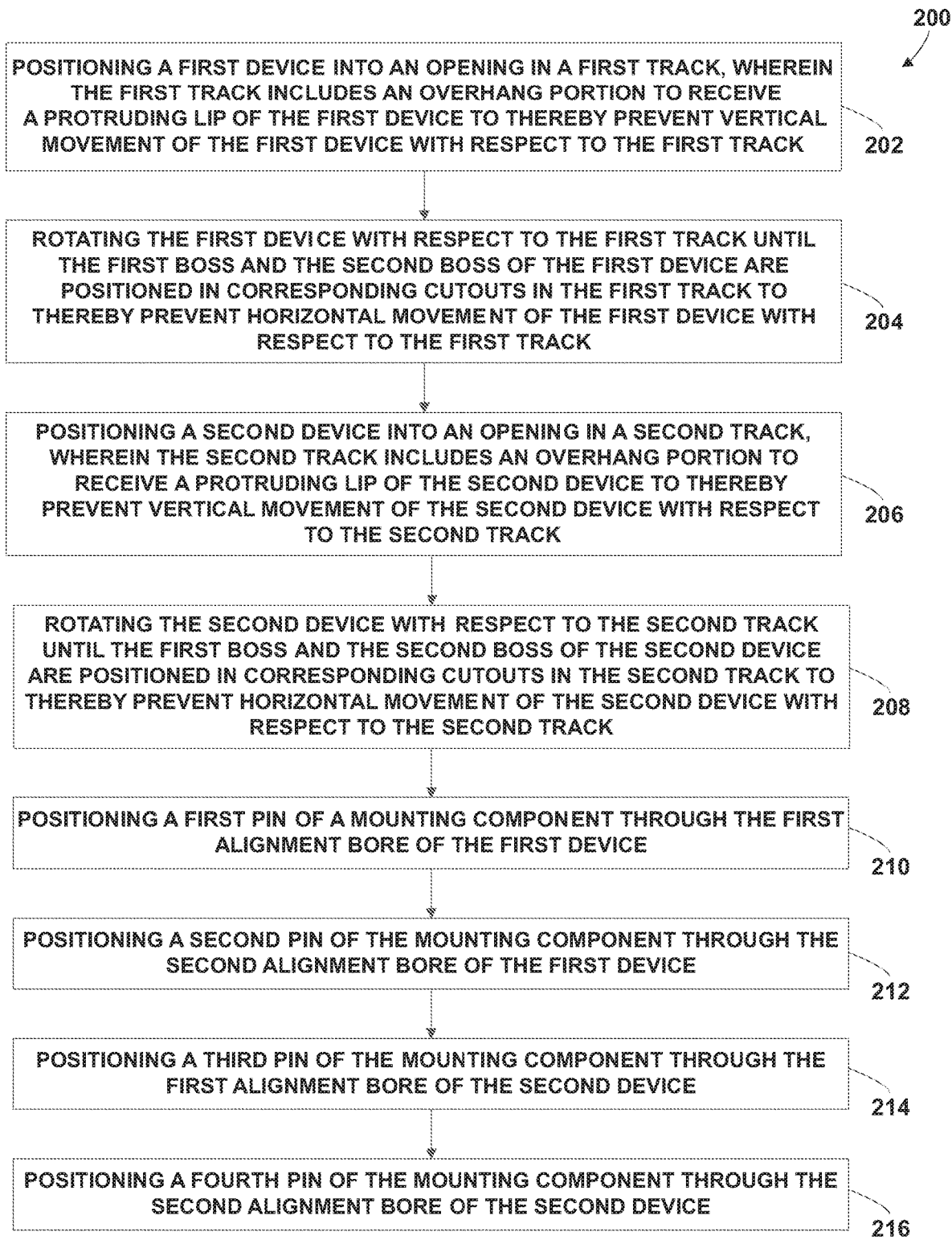
FIG. 9 is a flowchart of an example method, according to an example embodiment.

In FIG. 9, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" means +/−5%.

As used herein, with respect to measurements, "substantially" means +/−5%.

As used herein, two axes are "substantially perpendicular" when there is a ninety degree angle between them +/−5%.

As used herein, "track mounted product" means any component that is configured to be attached to a track in an aircraft, including seats and seat furniture, stowages/closets, cabin dividers, electronic components, or other aircraft interior monuments including, but not limited to, lavatories, galleys, or video control centers, as examples.

Illustrative, non-exhaustive examples, which may or may not be claimed, of the subject matter according the present disclosure are provided below.

Within examples, the disclosure herein provides a quick engagement seat track fitting device and method for the rapid attachment of a track mounted product, enclosure or similar component directly to the structural seat track rails within the aircraft cabin. In particular, the device described herein drastically simplifies installation of seat track mounted track mounted products, without the usage of complex mechanisms. The new seat track installation device minimizes the number of fasteners required for installation. Furthermore, required hardware can now be placed in a convenient to access location, eliminating ergonomic concerns of existing seat track fittings that must be fastened into the seat track.

Unlike other fastener-less seat track fittings on the market today, the seat track installation device described herein eliminates the need for a complex mechanism. Instead, the device utilizes simple machined parts without the need for moving components that drive complexity and cost. The device is tailored for products that are removed and/or installed frequently due to the simplified design and quick installation and removal. In addition, the simplicity of design and absence of a mechanism or moving parts eliminates the need to perform cycle and load certification testing. As such, the device can be analyzed using traditional finite element methods. Furthermore, the device may be scaled to any size for tailored solutions based on load magnitudes.

Various other features of the example devices and systems discussed above, as well as methods for using these devices, are also described hereinafter with reference to the accompanying figures.

Figure 1:
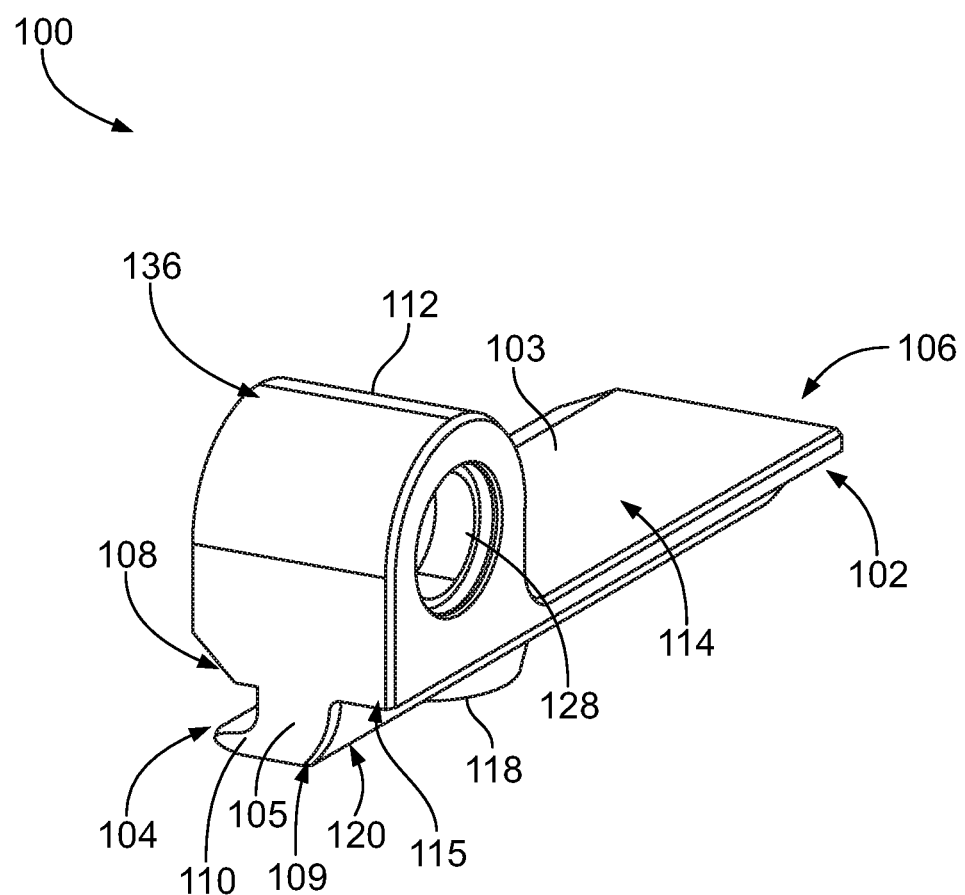
FIG. 1 is a perspective view of a device, according to an example embodiment.

Referring generally to FIG. 1, an exemplary device 100 is disclosed. The device 100 includes an elongated member 102 having a flange 103 and a body 105. The elongated member 102 includes a first end 104 and a second end 106 extending along a longitudinal axis of the elongated member 102. In one example, the length of the elongated member 102 ranges from about 5.08 cm to about 254 cm. The flange 103 includes a first side 114 and a second side 115, the second side 115 opposite the first side 114. The body 103 is connected to and extends away from the second side 115 of the flange 103. The body 105 includes a first side 108, a second side 120, and a third side 109. The first side 108 of the body 105 is opposite the second side 120 of the body 105, and the third side 109 of the body 105 is opposite the first side 114 of the flange 103. The first side 108 of the body 105 includes a protruding lip 110 extending from at least a portion of the body 105 between the first end 104 and the second end 106 of the elongated member 102.

The device 100 also includes a first alignment bore 112 coupled to the first side 114 of the flange 103 between the first end 104 and the second end 106 of the elongated member 102. In one example, a longitudinal axis of the first alignment bore 112 is positioned substantially perpendicular to the longitudinal axis of the elongated member 102. In another example, the longitudinal axis of the first alignment bore 112 is positioned at another angle with respect to the longitudinal axis of the elongated member 102. The device 100 also includes a first boss 118 extending from the second side 115 of the body 105 between the first end 104 and the second end 106 of the elongated member 102.

Figure 2:
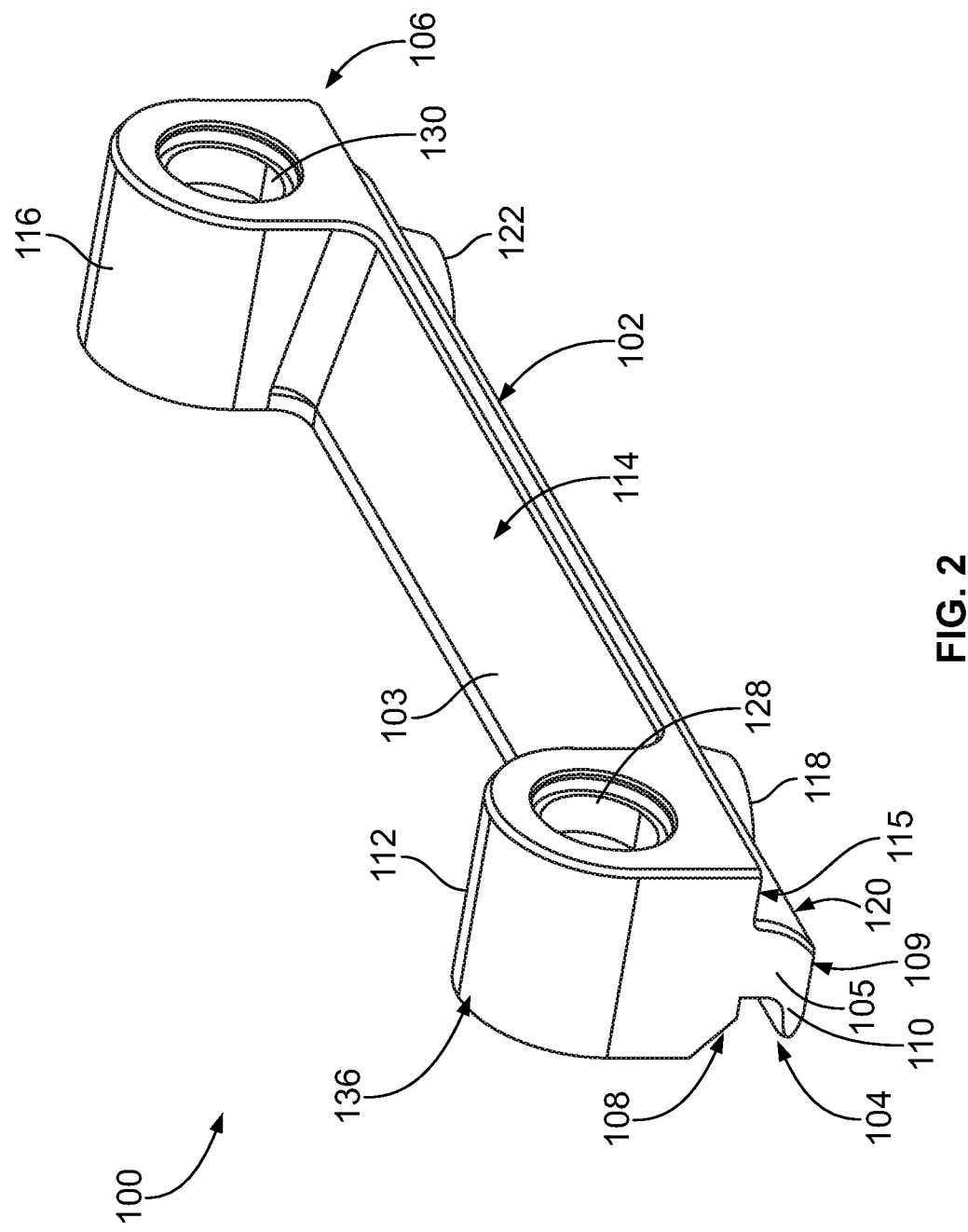
FIG. 2 is a perspective view of another device, according to an example embodiment.

In one example, as shown in FIG. 2, the device 100 also includes a second alignment bore 116 coupled to the first side 114 of the flange 103. In one example, a longitudinal axis of the second alignment bore 116 is positioned substantially perpendicular to the longitudinal axis of the elongated member 102. In another example, the longitudinal axis of the first alignment bore 112 is positioned at another angle with respect to the longitudinal axis of the elongated member 102. Further, the device 100 may also include a second boss 122 extending from the second side 120 of the body 105 between the first end 104 and the second end 106 of the elongated member 102.

Figure 4:
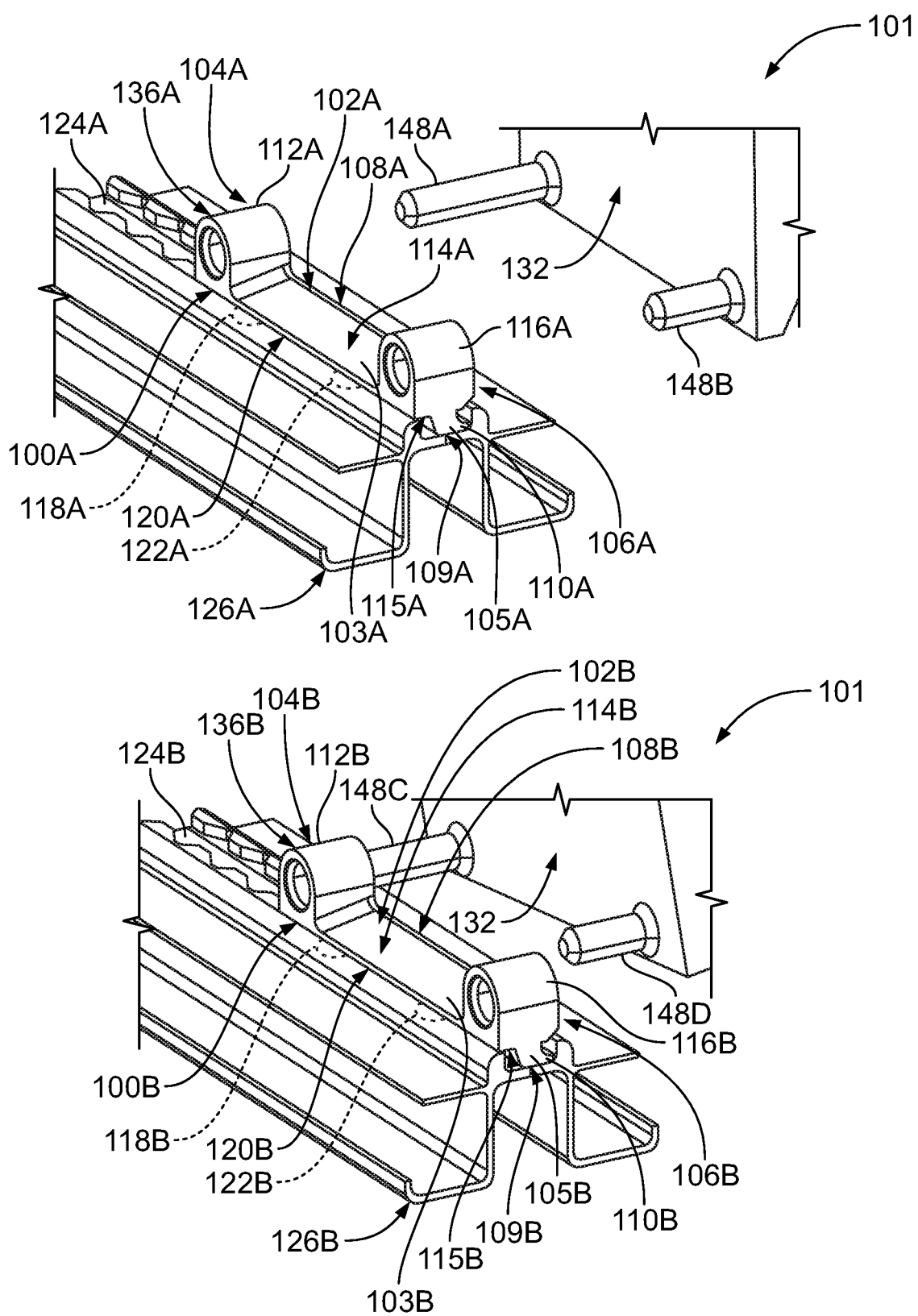
FIG. 4 is a perspective view of a system, according to an example embodiment.

In one example, the first alignment bore 112 is positioned adjacent to the first end 104 of the elongated member 102, and the second alignment bore 116 is positioned adjacent to the second end 106 of the elongated member 102. In one example, the first boss 118 is spaced a first distance from the second boss 122, the first alignment bore 112 is spaced a second distance from the second alignment bore 116, and the first distance is equal to the second distance. In another example, the first boss 118 is positioned between the first alignment bore 112 and the second boss 122, and the second boss 122 is positioned between the first boss 118 and the second alignment bore 116. As shown in FIG. 2, in one example the first boss 118 and the second boss 122 are semi-circular in shape, the semi-circular surface extending outward from the second surface 120 of the body 105. Such a semi-circular shape may be dimensioned to fit within corresponding cutouts 124A, 124B of a track 126A, 126B, as shown in FIG. 4 and as described in additional detail below. In most cases, such a track 126A, 126B is universal and standard in the industry. In one example, the cutouts 124A, 124B of the track 126A, 126B are spaced apart in 2.54 cm increments. In such an example, the first boss 118 and the second boss 122 are spaced apart at a multiple of 2.54 cm.

While FIG. 1 illustrates a single boss 118 and FIG. 2 illustrates two bosses 118, 122, the number of bosses can be increased to any number for additional capability in the forward/aft direction as desired for the particular use case. Similarly, while FIG. 1 illustrates a single alignment bore 112 and FIG. 2 illustrates two alignment bores 112, 116, the number of alignment bores can also be increased for additional strength between the interface of the fitting and the track mounted product.

In one example, as shown in FIGS. 1 and 2, the first alignment bore 112 includes a first bushing 128. As shown in FIG. 2, the second alignment bore 116 includes a second bushing 130. The bushings 128, 130 are inserted into the alignment bores 112, 116 to provide a bearing surface therein. The bushings 128, 130 may be a sleeve bushing, a flanged bushing, a split bushing, or a clenched bushing, as examples. In use, the bushings 128, 130 facilitate smooth installation of a track mounted product 132 with the device 100 (as shown and described in FIGS. 3A-3B), and also prevent rattling of the track mounted product 132 with respect to the device 100 during flight.

Figure 3:
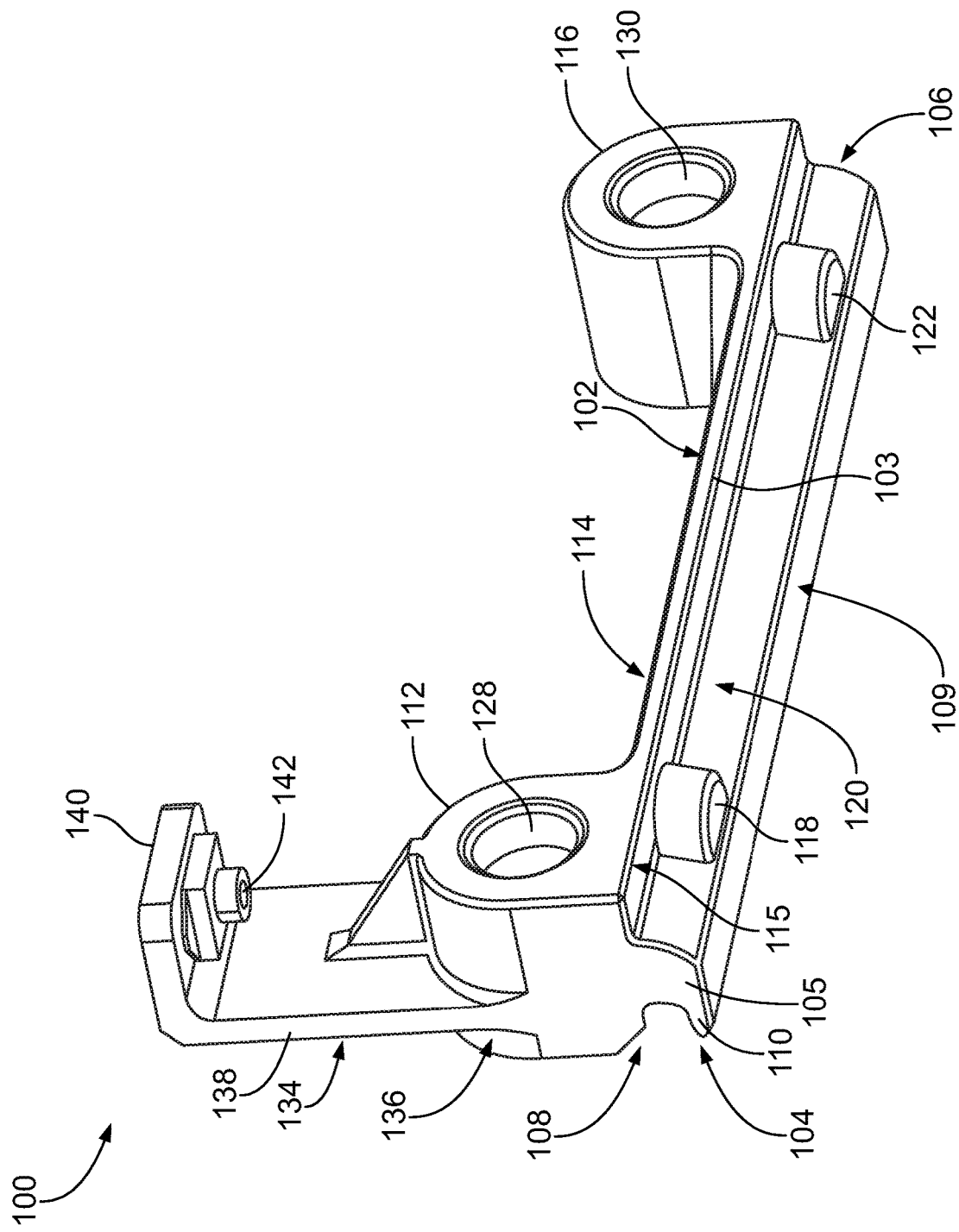
FIG. 3 is a perspective view of yet another device, according to an example embodiment.

FIG. 3 illustrates another example device 100, according to an example embodiment. As shown in FIG. 3, in one example the device 100 further includes a mounting plate 134 extending vertically from a surface 136 of the first alignment bore 112. In another example, the mounting plate 134 extends vertically from the first surface 114 of the flange 103. The mounting plate 134 is connectable to a track mounted product 132 as discussed in additional detail below. In one example, the mounting plate 134 includes a through-hole 142 through which a fastener is configured to be inserted to thereby connect the mounting plate 134 to the track mounted product 132. As shown in FIG. 3, in one example the mounting plate 134 includes a first portion 138 and a second portion 140. The first portion 138 extends vertically from the first surface 114 of the flange or the surface 136 of the first alignment bore 112. The second portion 140 extends perpendicular to the first portion 138, such that the mounting plate 134 has an L-shape. In such an example, the mounting plate 134 further includes a through-hole 142 positioned in the second portion 140 of the mounting plate 134. In one example, the through-hole 142 is threaded. In another example, the second portion 140 includes another coupling mechanism to secure the mounting plate 134 to a track mounted product, as discussed in additional detail below.

In use, the device 100 is positionable within an opening in a seat track to thereby limit vertical movement of the device 100 with respect to the seat track. Further, the first boss 118 and/or the second boss 122 is engageable with a corresponding cutout in the seat track to limit horizontal movement of the device 100 with respect to the seat track, as discussed in additional detail below.

In certain embodiments, such as shown in any one of FIGS. 1-3, example devices or components thereof are made using an additive-manufacturing machine, such as stereolithography, multi-jet modeling, inkjet printing, selective laser sintering/melting, and fused filament fabrication, among other possibilities. An example additive-manufacturing machine creates the device 100 described in any one of FIGS. 1-3 using a single material. Such a material includes stainless steel, titanium, nickel super-alloy, aluminum, polymer composites (e.g., carbon fiber reinforced nylon) and polymer nanocomposites (e.g., carbon nanotube filled nylon), polyether ether ketone (PEEK), polyethylene (PE), or polypropylene (PP), as examples. In another example, the additive-manufacturing process is a multi-material additive-manufacturing process such that various components of the device 100 are formed using a material with a material property than the other components. In such an example, the elongated member 102, the first alignment bore 112, the second alignment bore 116, the first boss 118, and the second boss 122 are made from a first material, and the bushings 128, 130 are made from a second material that is different than the first material. In one particular example, the first material provides a rigid structure to withstand the load of a track mounted product, and the second material reduces friction and prevents rattling of the track mounted product with the device 100. Other examples are possible as well.

The device 100 described above in relation to FIGS. 1-3 is a part of a system 101 including a first device 100A configured to rotationally engage a first track 126A, and a second device 100B configure to rotationally engage a second track 126B, as shown in FIG. 4. The first and second devices 100A, 100B together to secure a track mounted product 132 to the tracks 126A, 126B, as shown in FIG. 4. In one example, the two devices 100A, 100B are identical to one another, and include two of the devices 100 described above. In another example, the first device 100A and the second device 100B are positioned as mirror images of one another. In such an example, each of the first device 100A and the second device 100B are an instance of the device 100 and include the features as described above in relation to any one of FIGS. 1-3, but the structures of each device 100A, 100B are reversed so that they face each other. In such an example, the first device 100A is rotated in a first direction with respect to the first track 126A during installation, and the second device 100B is rotated in an opposite direction with respect to the second track 126B during installation.

In particular, as shown in FIG. 4, the system 101 may include a first device 100A and a second device 100B. The first device 100A includes a first elongated member 102A having a first flange 103A and a first body 105A. The first elongated member 102A includes a first end 104A and a second end 106A extending along a longitudinal axis of the first elongated member 102A. The first flange 103A includes a first side 114A and a second side 115A, the second side 115A opposite the first side 114A. The first body 105A is connected to and extends away from the second side 115A of the first flange 103A. The first body 105A includes a first side 108A, a second side 120A, and a third side 109A. The first side 108A of the first body 105A is opposite the second side 120A of the first body 105A, and the third side 109A of the first body 105A is opposite the first side 114A of the first flange 103A. The first side 114A of the first body 105A includes a first protruding lip 110A extending from at least a portion of the first body 105A between the first end 104A and the second end 106A of the first elongated member 102A. The first device 100A also includes a first alignment bore 112A coupled to the first side 114A of the first flange 103A between the first end 104A and the second end 106A of the first elongated member 102A. In one example, the longitudinal axis of the first alignment bore 112A is positioned substantially perpendicular to the longitudinal axis of the first elongated member 102A. In another example, the longitudinal axis of the first alignment bore 112A is positioned at another angle with respect to the longitudinal axis of the first elongated member 102A. The first device 100A also includes a second alignment bore 116A coupled to the first side 114A of the first flange 103A. In one example, a longitudinal axis of the second alignment bore 116A is positioned substantially perpendicular to the longitudinal axis of the first elongated member 102A. In another example, the longitudinal axis of the second alignment bore 116A is positioned at another angle with respect to the longitudinal axis of the first elongated member 102A. The first device 100A also includes a first boss 118A extending from the second side 120A of the first body 105A between the first end 104A and the second end 106A of the first elongated member 102A. The first device 100A also includes a second boss 122A extending from the second side 120A of the first body 105A between the first end 104A and the second end 106A of the first elongated member 102A.

Similarly, the second device 100B includes a second elongated member 102A having a second flange 103B and a second body 105B. The second elongated member 102B includes a first end 104B and a second end 106B extending along a longitudinal axis of the second elongated member 102B. The second flange 103B includes a first side 114B and a second side 115B, the second side 115B opposite the first side 114B. The second body 105B is connected to and extends away from the second side 115B of the second flange 103B. The second body 105B includes a first side 108B, a second side 120B, and a third side 109B. The first side 108B of the second body 105B is opposite the second side 120B of the second body 105B, and the third side 109B of the second body 105B is opposite the first side 114B of the second flange 103B. The first side 108B of the second body 105B includes a second protruding lip 110B extending from at least a portion of the second body 105B between the first end 104B and the second end 106B of the second elongated member 102B. The second device 100B also includes a third alignment bore 112B coupled to the first side 114B of the second flange 103B between the first end 104B and the second end 106B of the second elongated member 102B. In one example, a longitudinal axis of the third alignment bore 112B is positioned substantially perpendicular to the longitudinal axis of the second elongated member 102B. In another example, the longitudinal axis of the third alignment bore 112B is positioned at another angle with respect to the longitudinal axis of the second elongated member 102B. The second device 100B also includes a fourth alignment bore 116B coupled to the first side 114B of the second flange 103B. In one example, a longitudinal axis of the fourth alignment bore 116B is positioned substantially perpendicular to the longitudinal axis of the second elongated member 102B. In another example, the longitudinal axis of the fourth alignment bore 116B is positioned at another angle with respect to the longitudinal axis of the elongated member 102B. The second device 100B also includes a third boss 118B extending from the second side 102B of the second body 105B between the first end 104B and the second end 106B of the second elongated member 102B. The second device 100B also includes a fourth boss 122B extending from the second side 120B of the second body 105B between the first end 104B and the second end 106B of the second elongated member 102B.

FIG. 4 further illustrates is a perspective view of the first and second pins 148A, 148B of the track mounted product 132 aligning with the first device 100A, according to an example embodiment. As shown in FIG. 4, the first pin 148A may be longer than the second pin 148B, and the third pin 148C may be longer than the fourth pin 148D. In such an embodiment, as shown in FIG. 4, the first pin 148A may initially engage the first alignment bore 112A of the first device 100A, and then the second pin 148B may engage the second alignment bore 116A of the first device 100A. Similarly, the third pin 148C may initially engage the first alignment bore 112B of the second device 100B, and then the fourth pin 148D may engage the second alignment bore 116B of the second device 100B. In another example, each of the pins 148A, 148B, 148C, 148D are the same length.

FIGS. 5A-5D illustrate a side view of the first device 100A rotationally engaging the first track 126A, according to an example embodiment. In particular, the first track 126A may include an opening 144A and an overhang portion 146A. As shown in FIGS. 5A-5B, the first device 100A is positioned into the opening 144A in the first track 126A. The overhang portion 146A of the first track 126A is configured to receive the protruding lip 110A of the first device 100A to thereby prevent vertical movement of the first device 100A with respect to the first track 126A. As shown in FIGS. 5C-5D, the first device 100A is rotated with respect to the first track 126A until the first boss 118 and the second boss 122 of the first device 100A are positioned in corresponding cutouts 124 in the first track 126A to thereby prevent horizontal movement of the first device 100A with respect to the first track 126A. As such, the device 100A freely rotates in and out of the first track 126A without requiring hardware of any kind. Although not shown in FIGS. 5A-5D, the second device 100B similarly rotationally engages the second track 126B, which has the same components as the first track 126A, including an overhang portion 146B.

Figure 6A:
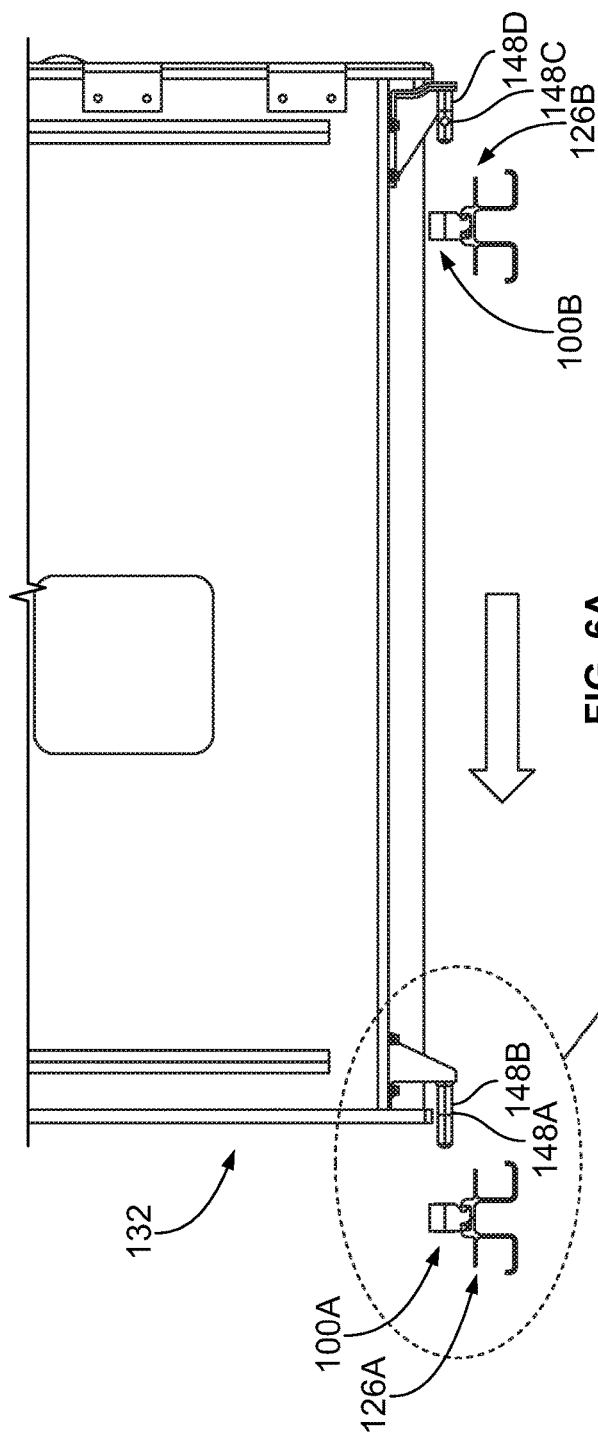
FIG. 6A is a side view of a track mounted product engaging the device of FIG. 2, according to an example embodiment.
Figure 6B:
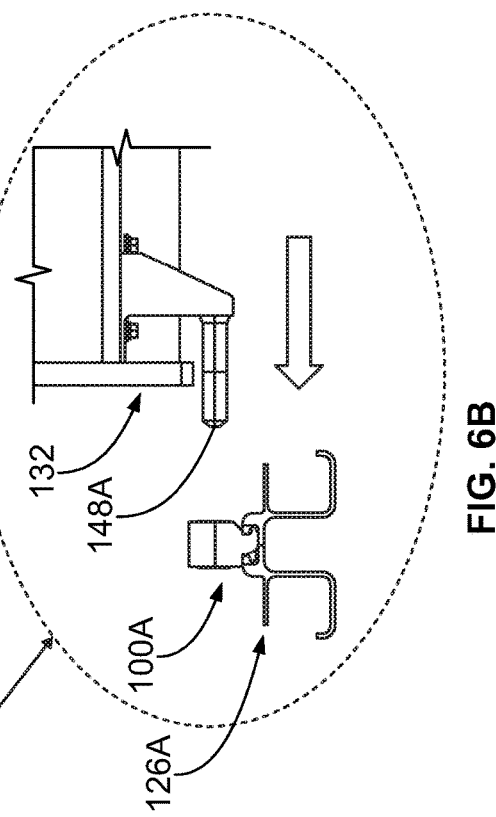
FIG. 6B is a zoomed in view of the track mounted product engaging the device of FIG. 2, according to an example embodiment.
Figure 7:
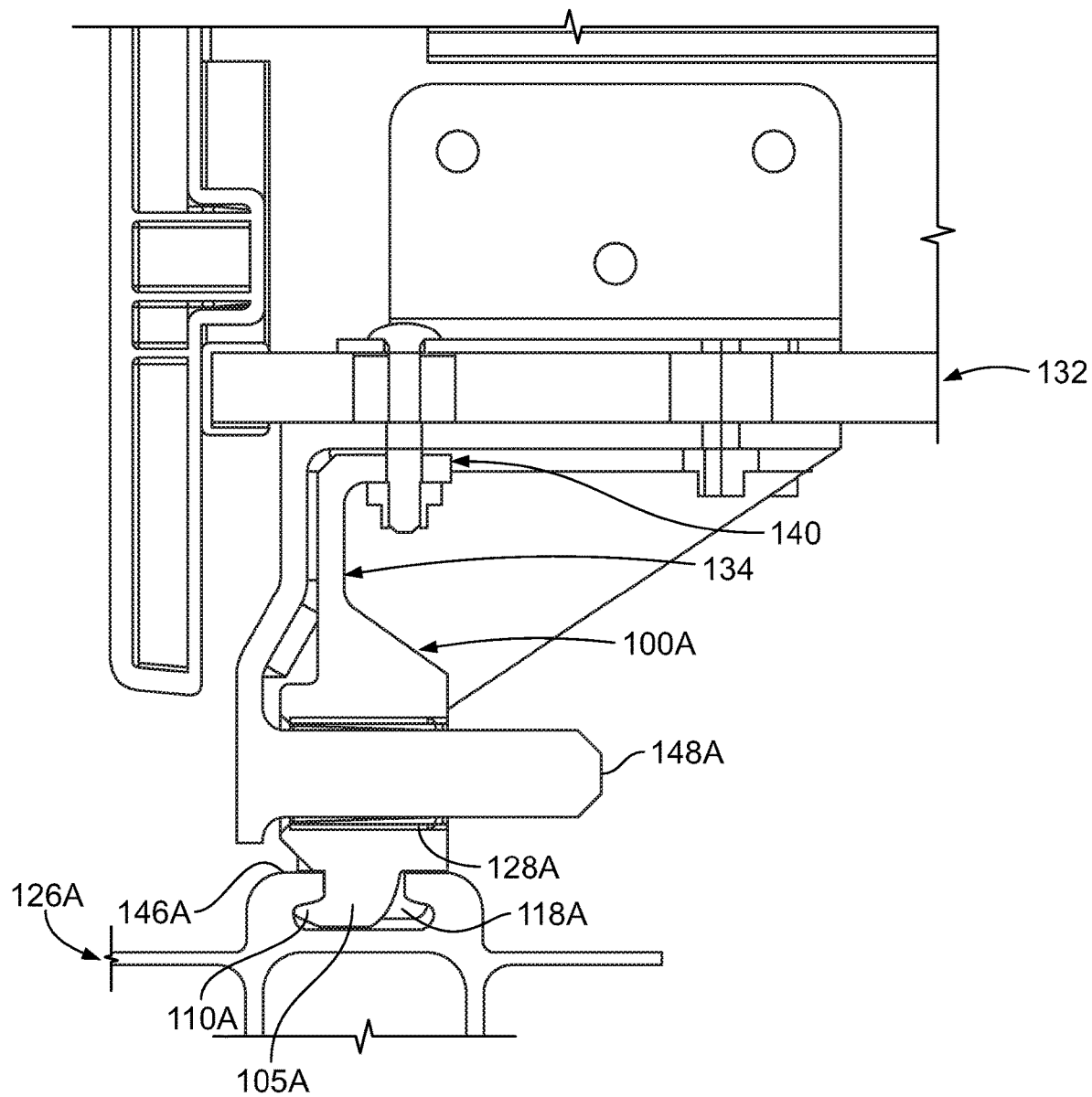
FIG. 7 is a side cross-section view of a track mounted product secured to the device of FIG. 3, according to an example embodiment.
Figure 8:
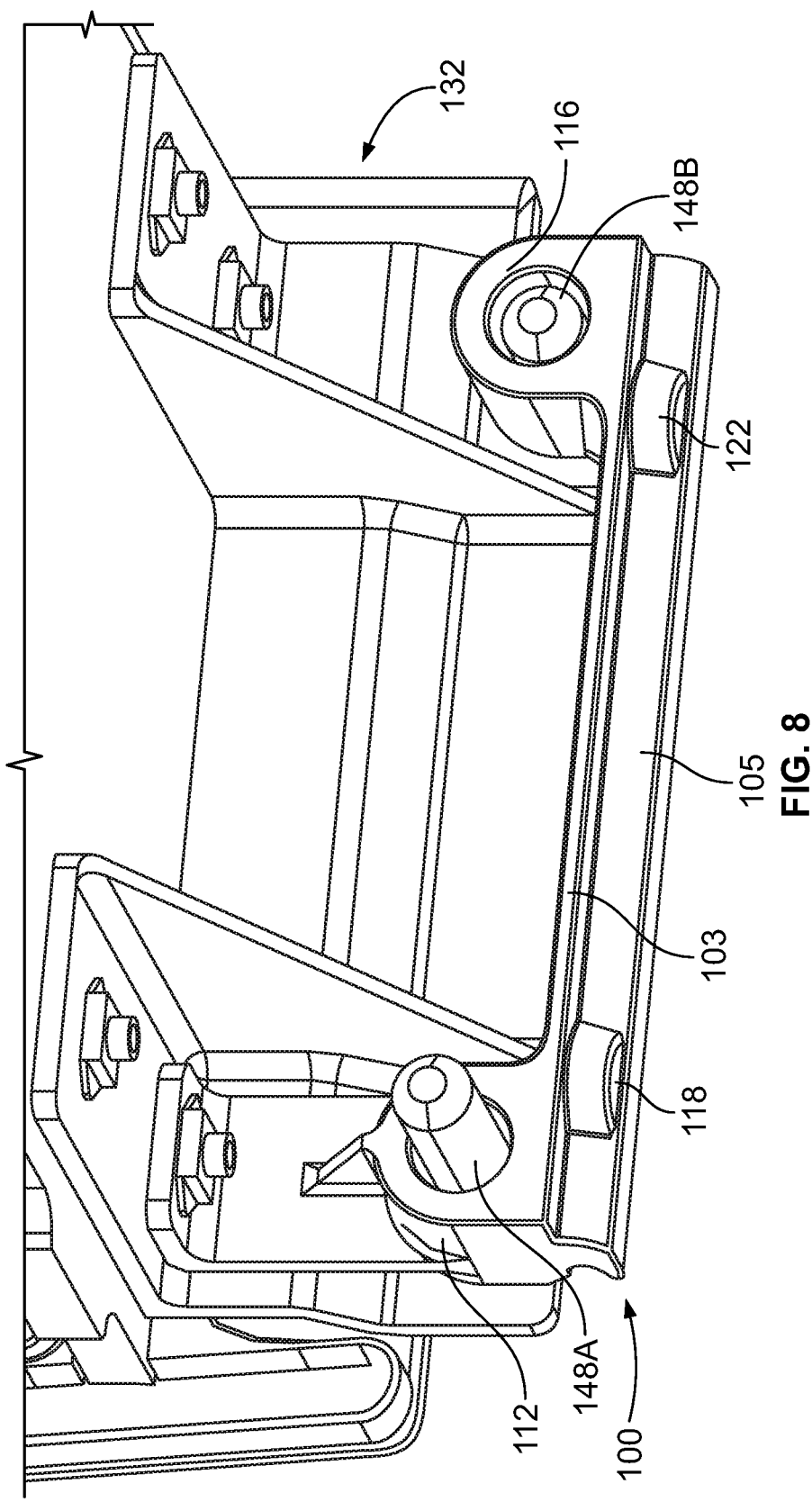
FIG. 8 is a perspective view of a track mounted product secured to the device of FIG. 3, according to an example embodiment.

Once the first device 100A and the second device 100B are positioned in the corresponding tracks 126A, 126B, the track mounted product 132 may be secured to the first and second devices 100A, 100B, as shown in FIGS. 6A-6B. In particular, FIG. 6A is a side view of the track mounted product 132 engaging the first device 100A and the second device 100B, while FIG. 6B is a zoomed in view of the track mounted product 132 engaging the first device 100A. As shown in FIG. 6A, the track mounted product 132 includes a first pin 148A, a second pin 148B (hidden from view in the side perspective shown in FIG. 6A), a third pin 148C, and a fourth pin 148D (hidden from view in the side perspective shown in FIG. 6A). When the four pins 148A-148D are inserted into the corresponding alignment bores 112, 116 of the first device 100A and the second device 100B, rotation of the devices 100A, 100B is no longer possible, thereby securing the track mounted product 132 to the tracks 126A, 126B. FIG. 7 is a side cross-section view of the track mounted product 132 secured to the mounting plate 134 of the first device 100A, and FIG. 8 is a perspective view of the track mounted product 132 secured to the mounting plate 134 of the second device 100B.

In one example, the third surface 109A, 109B of the body 105A, 105B of the first and second devices 100A, 100B are load bearing when the track mounted product is coupled to the devices 100A, 100B. In another example, the second surface 115A, 115B of the flange 103A, 103B of the first and second devices 100A, 100B are load bearing when the track mounted product is coupled to the devices 100A, 100B. In yet another example, both the third surface 109A, 109B of the body 105A, 105B of the first and second devices 100A, 100B and the second surface 115A, 115B of the flange 103A, 103B of the first and second devices 100A, 100B are load bearing when the track mounted product is coupled to the devices 100A, 100B.

FIG. 9 is a block diagram of an example method for securing a track mounted product to tracks in an aircraft. Method 200 shown in FIG. 9 presents an embodiment of a method for installing and using the devices 100, 100A, and 100B of FIGS. 1-8, as an example. Method 200 includes one or more operations, functions, or actions as illustrated by one or more of blocks 202-216. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes positioning a first device 100A into an opening 144A in a first track 126A, wherein the first track 126A includes an overhang portion 146A to receive a protruding lip 110A of the first device 100A to thereby prevent vertical movement of the first device 100A with respect to the first track 126A. Next, at block 204, the method 200 includes rotating the first device 100A with respect to the first track 126A until a first boss 118A and a second boss 122A of the first device 100A are positioned in corresponding cutouts 124A in the first track 126A to thereby prevent horizontal movement of the first device 100A with respect to the first track 126A. Next, at block 206, the method 200 includes positioning a second device 100B into an opening 144B in a second track 126B, wherein the second track 126B includes an overhang portion 146B to receive a protruding lip 110B of the second device 100B to thereby prevent vertical movement of the second device 100B with respect to the second track 126B. The first track 126A and the second track 126B are substantially parallel to one another. Next, at block 208, the method 200 includes rotating the second device 100B with respect to the second track 126B until a first boss 118B and a second boss 122B of the second device 100B are positioned in corresponding cutouts 124B in the second track 126B to thereby prevent horizontal movement of the second device 100B with respect to the second track 126B.

In one example, the two devices 100A, 100B are identical to one another, and include the features of device 100 described above. In another example, the first device 100A and the second device 100B are positioned as mirror images of one another, and include the features of device 100 described above. In such an example, the method 200 further comprises rotating the first device 100A in a first direction with respect to the first track 126B and rotating the second device 100B in an opposite direction with respect to the second track 126B.

Next, at block 210, the method 200 includes positioning a first pin 148A of a track mounted product 132 through a first alignment bore 112A of the first device 100A. Next, at block 212, the method 200 includes positioning a second pin 148B of the track mounted product 132 through a second alignment bore 116A of the first device 100A. Next, at block 214, the method 200 includes positioning a third pin 148C of a track mounted product 132 through a first alignment bore 112B of the second device 100B. Next, at block 216, the method 200 includes positioning a fourth pin 148D of the track mounted product 132 through a second alignment bore 116B of the second device 100B.

In one example, the method 200 further includes aligning the longitudinal axis of the first alignment bore 112A of the first device 100A with the longitudinal axis of the first alignment bore 112B of the second device 100B when the first and second devices 100A, 100B are positioned in their respective tracks 126A, 126B. In such an example, the method 200 also include aligning the longitudinal axis of the second alignment bore 116A of the first device 100A with the longitudinal axis of the second alignment bore 116B of the second device 100B when the first and second devices 100A, 100B are positioned in their respective tracks 126A, 126B.

In another example, the first device 100A and the second device 100B further include a mounting plate 134A, 134B extending vertically from the a first surface 114A, 114B of the flange 103A, 103B or the surface 136A, 136B of the first alignment bore 112A, 112B, as discussed above in relation to FIG. 3. In such an example, the method 200 further includes securing the track mounted product 132 to the mounting plate 134A, 134B. In one example, the mounting plate 134A, 134B is used to secure the track mounted product 132 to the device 100 via a nut and bolt through the through-hole 142, or through some other hardware. As such, the mounting plate 134A, 134B provides easy access to the hardware, thereby improving the ease of installation of the track mounted product 132. In another example, the through-hole 142 is threaded, so the track mounted product 132 can be secured to the mounting plate 134 by tightening a threaded bolt into the threaded through-hole 142. Other methods of securing the track mounted product 132 to the mounting plate are possible as well.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device comprising:
   an elongated member having a flange and a body, wherein the elongated member includes a first end and a second end extending along a longitudinal axis of the elongated member, wherein the flange includes a first side and a second side, the second side opposite the first side, wherein the body is connected to and extends away from the second side of the flange, wherein the body includes a first side, a second side, and a third side, wherein the first side of the body is opposite the second side of the body, and the third side of the body is opposite the first side of the flange, and wherein only the first side of the body includes a protruding lip extending from at least a portion of the body between the first end and the second end of the elongated member to thereby form a gap between the protruding lip and the second side of the flange solely on the first side of the body, and wherein the protruding lip is rotationally positionable within an opening in a seat track to limit vertical movement of the device with respect to the seat track;
   a first alignment bore coupled to the first side of the flange between the first end and the second end of the elongated member; and
   a first boss extending from the second side of the body between the first end and the second end of the elongated member.

2. The device of claim 1, further comprising:
   a second alignment bore coupled to the first side of the flange; and
   a second boss extending from the second side of the body between the first end and the second end of the elongated member.

3. The device claim 2, wherein the first alignment bore is positioned adjacent to the first end of the elongated member, and wherein the second alignment bore is positioned adjacent to the second end of the elongated member.

4. The device of claim 2, wherein the first boss is spaced a first distance from the second boss, wherein the first alignment bore is spaced a second distance from the second alignment bore, and wherein the first distance is equal to the second distance.

5. The device of claim 2, wherein the first boss is positioned between the first alignment bore and the second boss, and wherein the second boss is positioned between the first boss and the second alignment bore.

6. The device of claim 2, wherein the first boss and the second boss are semi-circular in shape, the semi-circular surface extending outward from the second surface of the body.

7. The device of claim 2, wherein the first alignment bore and the second alignment bore each include a bushing.

8. The device of claim 1, further comprising a mounting plate extending vertically from at least one of the first surface of the flange or a surface of the first alignment bore.

9. The device of claim 8, wherein the mounting plate is connectable to a track mounted product.

10. The device of claim 8, wherein the mounting plate comprises:
a first portion extending vertically from at least one of the first surface of the flange or the surface of the first alignment bore.

11. The device of claim 10, further comprising a through-hole positioned in the first portion of the mounting plate.

12. The device of claim 10, further comprising:
a second portion extending perpendicular to the first portion, such that the mounting plate has an L-shape.

13. The device of claim 1, wherein the first boss is engageable with a corresponding semi-circular shaped cut-out in the seat track to limit horizontal movement of the device with respect to the seat track.

14. A system comprising:
a first device, comprising:
a first elongated member having a first flange and a first body, wherein the first elongated member includes a first end and a second end extending along a longitudinal axis of the first elongated member, wherein the first flange includes a first side and a second side, the second side opposite the first side, wherein the first body is connected to and extends away from the second side of the first flange, wherein the first body includes a first side, a second side, and a third side, wherein the first side of the first body is opposite the second side of the first body, and the third side of the first body is opposite the first side of the first flange, and wherein only the first side of the first body includes a first protruding lip extending from at least a portion of the first body between the first end and the second end of the first elongated member to thereby form a first gap between the first protruding lip and the second side of the first flange solely on the first side of the first body, and wherein the first protruding lip is rotationally positionable within a first opening in a first seat track to limit vertical movement of the first device with respect to the first seat track;
a first alignment bore coupled to the first side of the first flange between the first end and the second end of the first elongated member;
a second alignment bore coupled to the first side of the first flange between the first end and the second end of the first elongated member;
a first boss extending from the second side of the first body between the first end and the second end of the first elongated member; and
a second boss extending from the second side of the first body between the first end and the second end of the first elongated member; and
a second device, comprising:
a second elongated member having a second flange and a second body, wherein the second elongated member includes a first end and a second end extending along a longitudinal axis of the second elongated member, wherein the second flange includes a first side and a second side, the second side opposite the first side, wherein the second body is connected to and extends away from the second side of the second flange, wherein the second body includes a first side, a second side, and a third side, wherein the first side of the second body is opposite the second side of the second body, and the third side of the second body is opposite the first side of the second flange, and wherein only the first side of the second body includes a second protruding lip extending from at least a portion of the second body between the first end and the second end of the second elongated member to thereby form a second gap between the second protruding lip and the second side of the second flange solely on the first side of the second body, and wherein the second protruding lip is rotationally positionable within a second opening in a second seat track to limit vertical movement of the second device with respect to the second seat track;
a third alignment bore coupled to the first side of the second flange between the first end and the second end of the second elongated member;
a fourth alignment bore coupled to the first side of the second flange between the first end and the second end of the second elongated member;
a third boss extending from the second side of the second body between the first end and the second end of the second elongated member; and
a fourth boss extending from the second side of the second body between the first end and the second end of the second elongated member.

15. The system of claim 14, wherein each of the first boss and the second boss are semi-circular in shape, the semi-circular surface extending outward from the second surface of the first body, and wherein each of the third boss and the fourth boss are semi-circular in shape, the semi-circular shape extending outward from the second surface of the second body.

16. The system of claim 14, wherein the first device further comprises a first mounting plate extending vertically from the first surface of the first flange or a surface of the first alignment bore, and wherein the second device further comprises a second mounting plate extending vertically from the first surface of the second flange or a surface of the third alignment bore.

17. The system of claim 16, wherein the first mounting plate and the second mounting plate are connectable to a track mounted product.

18. The system of claim 14, wherein the first device and the second device are positioned as mirror images of one another.

19. The system of claim 14, wherein each of the first alignment bore, the second alignment bore, the third alignment bore, and the fourth alignment bore include a bushing.

20. The system of claim 14, further comprising a track mounted product comprising:
a first pin positionable through the first alignment bore;
a second pin positionable through the second alignment bore;
a third pin positionable through the third alignment bore; and a fourth pin positionable through the fourth alignment bore.

21. The system of claim 14, wherein the track mounted product comprises at least one of a seat, a seat furniture, a stowage, a closet, a cabin divider, an electronic component, a lavatory, a galley, or a video control center.

22. The system of claim 14, wherein the second seat track is positioned parallel to the first seat track.

23. The system of claim 14, wherein the first protruding lip is positionable within the first opening in the first seat track to limit vertical movement of the first device with respect to the first seat track, wherein the first boss and the second boss are engageable with corresponding cutouts in the first seat track to limit horizontal movement of the first device with respect to the first seat track, wherein the second protruding lip is positionable within the second opening in the second seat track to limit vertical movement of the second device with respect to the second seat track, and wherein the third boss and the fourth boss are engageable with corresponding cutouts in the second seat track to limit horizontal movement of the second device with respect to the second seat track.

24. A method, comprising:
   rotationally positioning a first device into an opening in a first track, wherein the first track includes a first overhang portion to receive a first protruding lip of a first body of a first elongated member of the first device, wherein the first protruding lip forms a first gap between the first protruding lip and a second side of a first flange of the first elongated member solely on a first side of the first body to thereby prevent vertical movement of the first device with respect to the first track;
   rotating the first device with respect to the first track until a first boss and a second boss of the first device are positioned in corresponding cutouts in the first track to thereby prevent horizontal movement of the first device with respect to the first track;
   rotationally positioning a second device into an opening in a second track, wherein the second track includes a second overhang portion to receive a second protruding lip of a second body of a second elongated member of the second device, wherein the second protruding lip forms a second gap between the second protruding lip and a second side of a second flange of the second elongated member solely on a first side of the second body to thereby prevent vertical movement of the second device with respect to the second track;
   rotating the second device with respect to the second track until a first boss and a second boss of the second device are positioned in corresponding cutouts in the second track to thereby prevent horizontal movement of the second device with respect to the second track;
   positioning a first pin of a track mounted product through a first alignment bore of the first device;
   positioning a second pin of the track mounted product through a second alignment bore of the first device;
   positioning a third pin of the track mounted product through a first alignment bore of the second device; and
   positioning a fourth pin of the track mounted product through a second alignment bore of the second device.

25. The method of claim 24, wherein the first device and the second device are mirror images of one another, and wherein the method comprises rotating the first device in a first direction with respect to the first track and rotating the second device in an opposite direction with respect to the second track.

26. The method of claim 24, further comprising:
   aligning the longitudinal axis of the first alignment bore of the first device with the longitudinal axis of the first alignment bore of the second device when the first and second devices are positioned in their respective tracks; and
   aligning the longitudinal axis of the second alignment bore of the first device with the longitudinal axis of the second alignment bore of the second device when the first and second devices are positioned in their respective tracks.

27. The method of claim 24, wherein the first device and the second device further comprise a mounting plate extending vertically from a first surface of a flange of the elongated member or a surface of the first alignment bore, the method further comprising:
   securing the track mounted product to the mounting plate.

\* \* \* \* \*